(12) United States Patent
Tanizume

(10) Patent No.: US 6,760,677 B2
(45) Date of Patent: Jul. 6, 2004

(54) MEASURED DATA SYNCHRONIZING SYSTEM AND MEASURED DATA SYNCHRONIZING METHOD

(75) Inventor: Yasuhiro Tanizume, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 6 days.

(21) Appl. No.: 10/321,539

(22) Filed: Dec. 18, 2002

(65) Prior Publication Data

US 2003/0158682 A1 Aug. 21, 2003

(30) Foreign Application Priority Data

Feb. 18, 2002 (JP) ........................................ 2002-039416

(51) Int. Cl.[7] ........................ G01D 18/00; G01D 21/00
(52) U.S. Cl. ...................................................... 702/89
(58) Field of Search .......................... 702/89, 85, 127

(56) References Cited

U.S. PATENT DOCUMENTS

| | | | | |
|---|---|---|---|---|
| 5,959,568 A | * | 9/1999 | Woolley ...................... | 342/42 |
| 6,088,659 A | * | 7/2000 | Kelley et al. ................. | 702/62 |
| 6,377,640 B2 | * | 4/2002 | Trans .......................... | 375/354 |
| 2002/0059536 A1 | * | 5/2002 | Saeki .......................... | 713/500 |

OTHER PUBLICATIONS

Kasajima et al., Darwin Series, Yokogawa Technical Report English Edition, No. 25, (1998) pp. 5–8.

* cited by examiner

Primary Examiner—John Barlow
Assistant Examiner—Demtrius Pretlow
(74) Attorney, Agent, or Firm—Westerman, Hattori, Daniels & Adrian, LLP

(57) ABSTRACT

The objective of the present invention is to achieve a measured data synchronizing system and a measured data synchronizing method which can determine the measured data whose synchronization is secured among measuring units without being restricted by the number of measuring units in the measuring part.

The present invention is characterized by preparing a communication line, a plurality of measuring units which receive a reference time from the above communication line as an input and output tuple data in which at least the above reference time and the measured data are contained and arranged as a tuple, and a data processing unit which outputs the reference time to the above communication line, receives tuple-data from each of the above plurality of measuring units as inputs and secures synchronization of the measured data among the measuring units based on the reference time of the tuple-data.

9 Claims, 7 Drawing Sheets

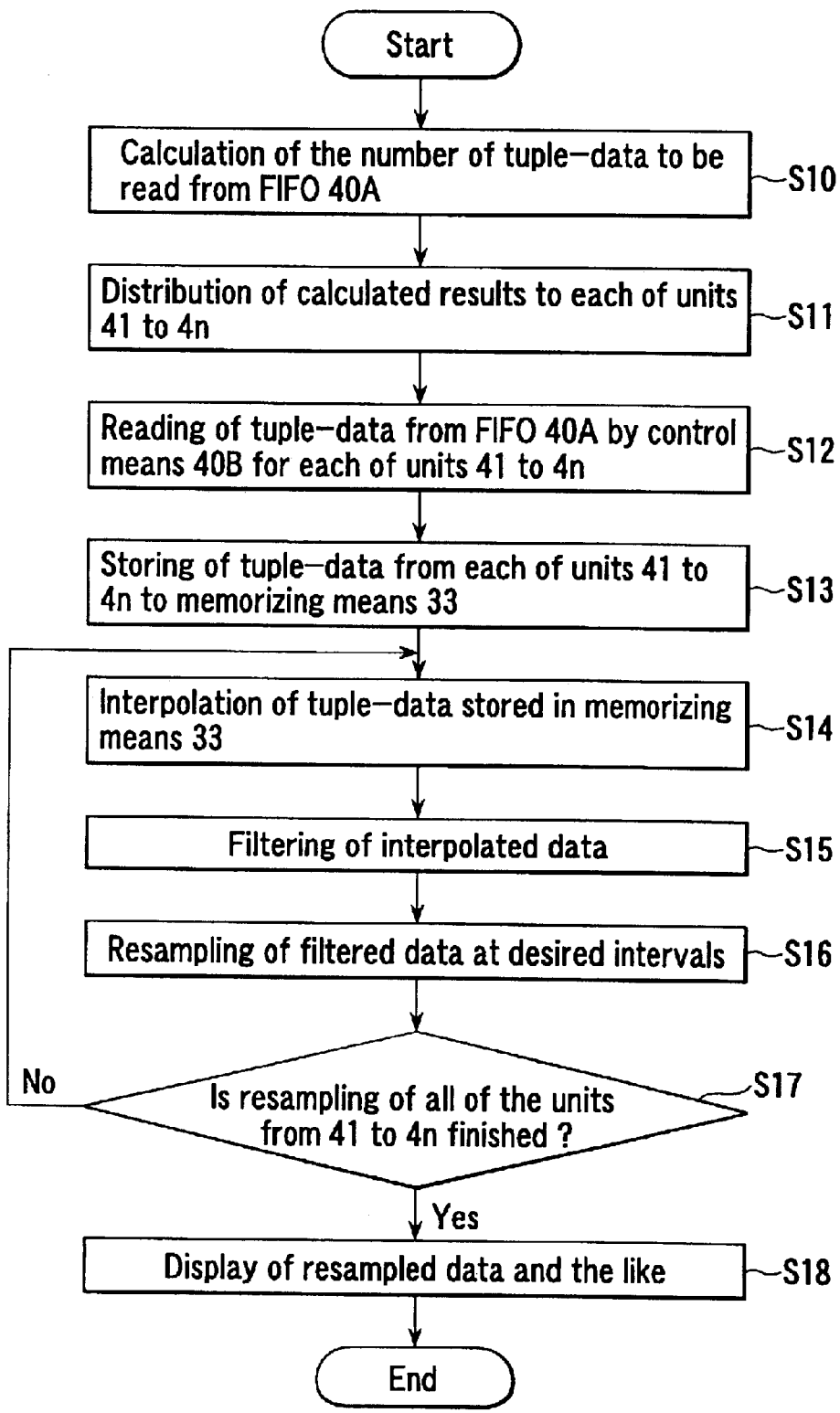

Interpolation by interpolating means 34

Filtering by filtering means 35

Resampling by resampling means 36

MEASURED DATA SYNCHRONIZING SYSTEM AND MEASURED DATA SYNCHRONIZING METHOD

BACKGROUND OF THE INVENTION

1. Field of the Invention

The present invention relates to a measured data synchronizing system where a plurality of measuring units, such as measuring instruments and sensors, are connected with data processing units such as computers, and specifically, relates to a measured data synchronizing system and a measured data synchronizing method, which can determine measured data whose synchronization is secured among units without being restricted by the number of units.

2. Description of the Prior Art

If various physical quantities of objects to be measured, such as temperature, voltage, etc., are to be measured using a plurality of units, or if a physical quantity of an object is to be measured in a plurality of places using each unit, or in similar cases, synchronization in measured results among these two or more units must be secured. A measured data synchronizing system can secure synchronization in measured data which are measured by each of two or more units.

FIG. 1 is a drawing showing an example configuration of conventional measured data synchronizing systems. In FIG. 1, the data processing unit PC consists of a computer or the like and comprises general communication circuit 10A. Measuring part 10 is composed of two or more units 11 to 1N (where N is a natural number) which are measuring instruments, sensors and/or the like, and its specific unit 11 is connected to the data processing unit PC with general communication line 100, such as Ethernet (registered trademark), to exchange signals with data processing unit PC. Each two of units 11 to 1N in measuring part 10 are connected with dedicated communication line 200, in which signal waveforms are hard to degrade, to exchange signals with each other.

Further, specific unit 11, which communicates with the data processing unit PC and which is also called the main unit, comprises general communication circuit 10A and dedicated communication circuit 10B. Units 12 to 1N are also called subunits and each comprises dedicated communication circuit 10B.

General communication circuit 10A and dedicated communication circuit 10B extract the desired signals from the input signals or output signals to be output after converting them to signals conforming to each communication protocol via general communication line 100 and dedicated communication line 200 respectively. In addition, dedicated communication circuit 10B inputs or outputs synchronizing signals for securing synchronization among units of 11 to 1N and minimizes delay times when synchronizing signals are transferred.

Operation of the system shown in FIG. 1 will be described below. Data processing unit PC outputs a signal composed of setting conditions for carrying out measurement (such as measuring period, measuring range, etc.), and commands for measurement start and end and the like to measuring part 10. These signals are converted to signals for communication (a packet that is a block of data) in general communication circuit 10A in the data processing unit PC and then output to general communication line 100. Main unit 11 in measuring part 10 receives the packet from the data processing unit PC via general communication line 100 as an input, extracts desired signals (setting conditions and commands) with its general communication circuit 10A from this input packet, and carries out measurement or the like based on this extracted signal.

Main unit 11 further converts the extracted signal into a signal having a dedicated communication protocol and outputs this signal to subunits 12 to 1N. Subunits 12 to 1N extract desired signals in each dedicated communication circuit 10B from a packet input via dedicated communication line 200 and start measurement or the like based on these extracted signals.

Further, main unit 11 distributes a synchronizing signal for securing synchronization in measurement by main unit 11 and subunits 12 to 1N to each of subunits 12 to 1N via dedicated communication circuit 10B and dedicated communication line 200. Each of subunits 12 to 1N measures the object to be measured based on the synchronizing signal from main unit 11 to acquire measured data. Measured data acquired by each of subunits 12 to 1N are output to main unit 11 via dedicated communication circuit 10B and dedicated communication line 200.

As described above, measured data which are synchronized among subunits 12 to 1N are input to main unit 11. Main unit 11 outputs the measured data synchronized among subunits 12 to 1N to the data processing unit PC via general communication circuit 10A and general communication line 100.

The data processing unit PC extracts a desired signal, such as measured data, from a packet in general communication circuit 10A, carries out desired processing or analysis of these measured data, and stores the measured data and the results of processing and analysis to a memorizing part not shown in the drawing, such as hard disk and memory, or displays the measured data and the results of processing and analysis in a display not shown in the drawing.

As seen above, it is required to supply a synchronizing signal from main unit 11 to each of subunits 12 to 1N to secure synchronization of measured data in each of units 11 to 1N. It is also required for each of units 11 to 1N to provide dedicated communication circuit 10B respectively in which processing more complicated than in general communication circuit 10A (such as compensation of delay time in the synchronizing signal due to the length of dedicated communication line 200 or regeneration of degraded waveforms) is necessary to synchronize the measured data. Furthermore, dedicated communication line 200 is more expensive than general communication line 100 because the former must transfer the synchronizing signal exactly.

In addition, even if dedicated communication circuit 10B and dedicated communication line 200 are used, increasing the length of dedicated communication line 200 due to the increase of the number of units 11 to 1N degrades the synchronizing signal waveforms, increases the delay time, and causes very large deviation of synchronization between units 11 to 1N. This restricts the number of connectable units 11 to 1N. Although a circuit for further decreasing the delay time for the purpose of securing synchronization can be designed, such a circuit configuration may be more complicated and thus it is not realistic.

On the other hand, for measurement at long intervals over a long time, such as for measurement of data in a plant, it is desired that exact synchronization among units is not required but increasing the number of units is required if synchronization to a certain extent can be secured.

SUMMARY OF THE INVENTION

The objective of the present invention is to achieve a measured data synchronizing system and a measured data synchronizing method which can determine the measured data whose synchronization is secured among measuring units without being restricted by the number of measuring units.

BRIEF DESCRIPTION OF THE DRAWINGS

FIG. 6 is a flowchart illustrating operations in the system shown in FIG. 2.

DETAILED DESCRIPTION OF THE PREFERRED EMBODIMENTS

Embodiments of the present invention will be described below using the drawings.

Figure 1:
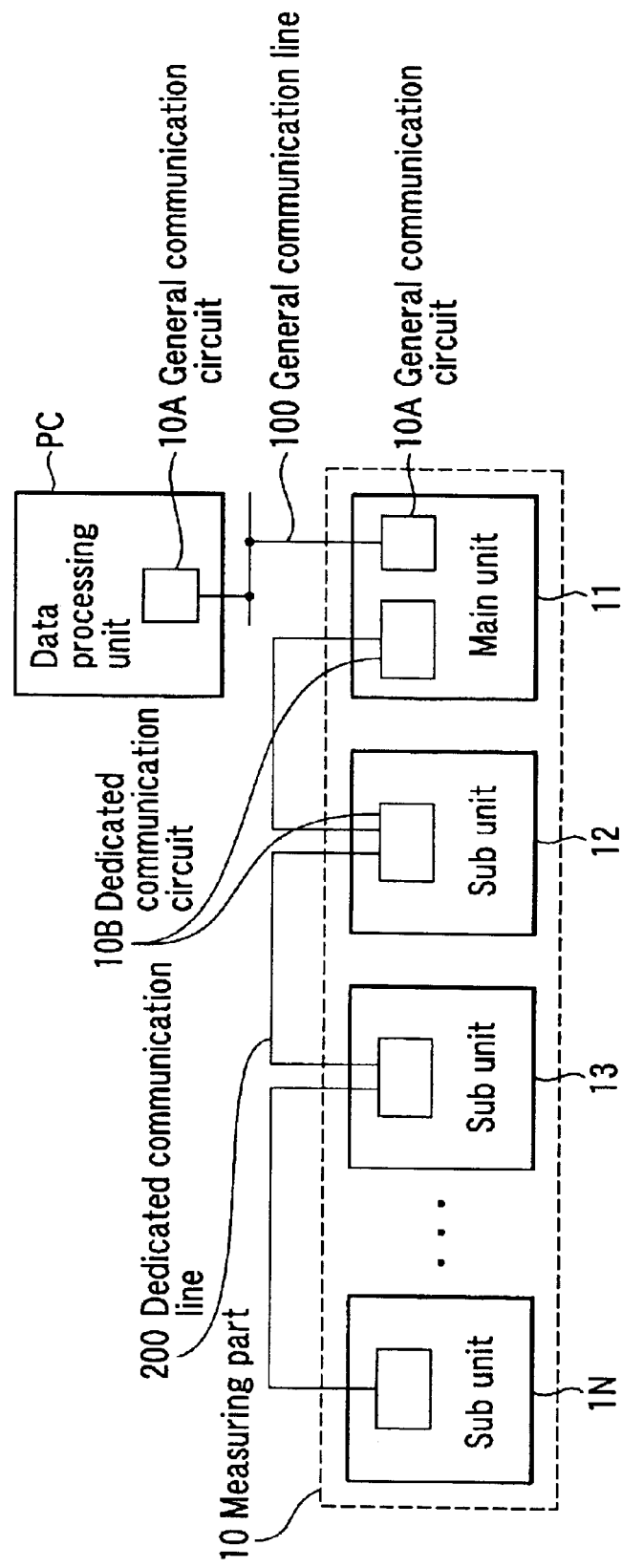
FIG. 1 is a drawing showing the configuration of a conventional measured data synchronizing system.
Figure 2:
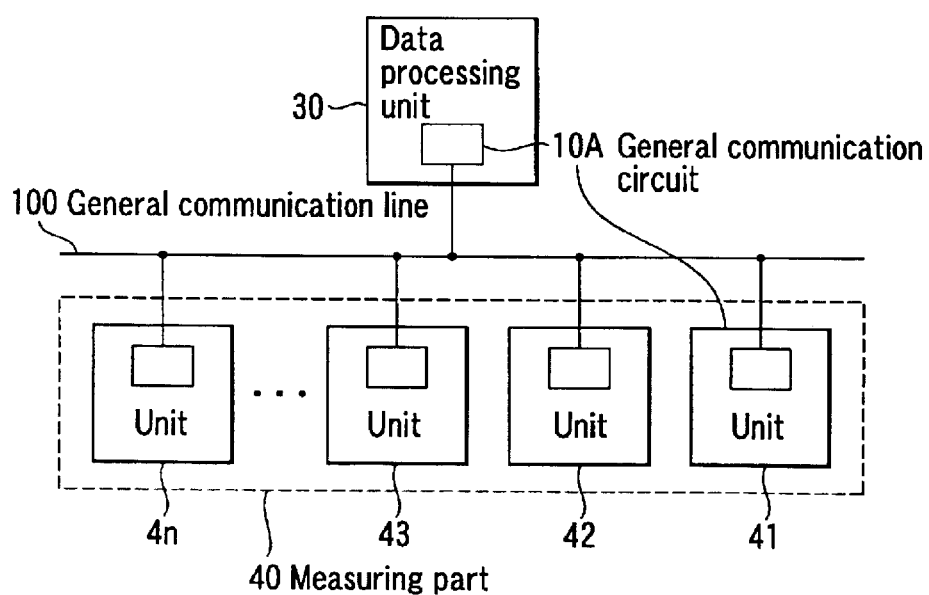
FIG. 2 is a drawing showing the configuration of a first embodiment of the present invention.

FIG. 2 is a drawing showing the configuration of an embodiment of the present invention. Parts identical to those shown in FIG. 1 are given the same signs and the description of them is omitted. In FIG. 2, data processing unit 30 is, for example, a computer and is connected to general communication line 100. Measuring part 40 is composed of a plurality of units 41 to 4n (where n is a natural number), which are either measuring instruments or sensors or the like, and each of units 41 to 4n is connected to general communication line 100 and signals are exchanged between each unit and data processing unit 30. In addition, data processing unit 30 and each of units 41 to 4n comprise general communication circuit 10A respectively and input/output signals from/to general communication line 100 using this general communication circuit 10A respectively.

Next, the detailed configuration will be described below.

Figure 3:
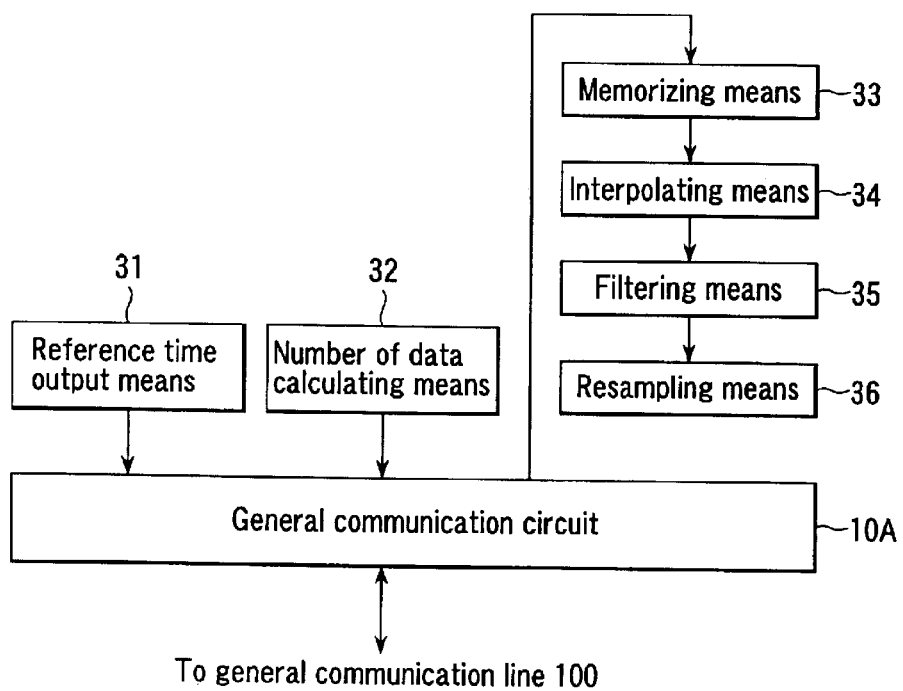
FIG. 3 is a drawing showing data processing unit 30 in detail in the system shown in FIG. 2.

FIG. 3 is a drawing showing an example configuration of data processing unit 30. In FIG. 3, reference time output means 31 outputs a reference time, which is the reference for securing synchronization among units 41 to 4n, to general communication circuit 10A. Number-of-data calculating means 32 calculates the number of measured data to be read from each of units 41 to 4n and outputs the results of calculation to general communication circuit 10A.

Memorizing means 33 stores in it the data output from general communication circuit 10A. Interpolating means 34 reads the data stored in memorizing means 33 and outputs the read data after interpolating them. Filtering means 35 outputs the interpolated data from interpolating means 34 after applying filtering processing to the data. Resampling means 36 resamples the filtered data from filtering means 35 at the desired instants and outputs the resampled data.

Figure 4:
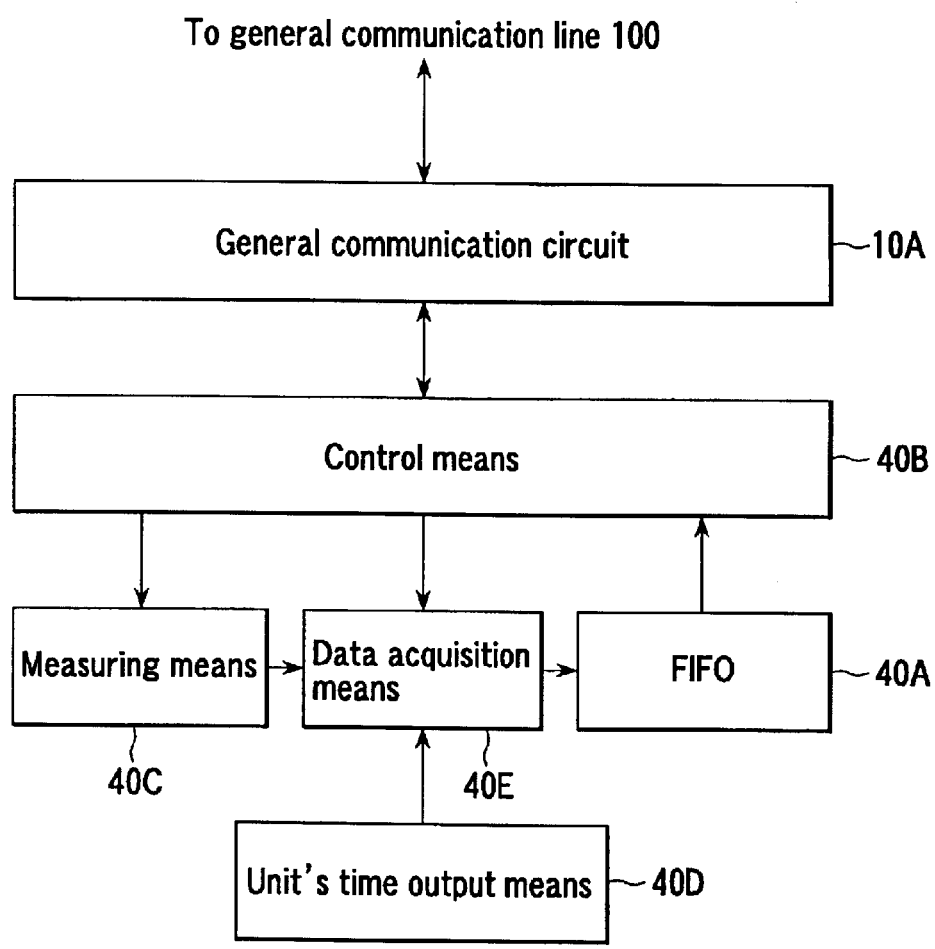
FIG. 4 is a drawing showing the configuration of units 41 to 4n in detail in the system shown in FIG. 2.

FIG. 4 is a drawing showing an example configuration of units 41 to 4n. In FIG. 4, data memorizing means 40A is an FIFO (First-In First-Out), which is a buffer in which data are taken out in the stored order. Control means 40B outputs reference times and commands based on the signals extracted by general communication circuit 10A. Control means 40B also reads required data from FIFO 40A and outputs them to general communication circuit 10A.

Measuring means 40C measures the objects to be measured according to the setup conditions and commands given from control means 40B and outputs the measured data. Unit's time (equipment time) output means 40D outputs the unit's time for backup to secure synchronization among units 41 to 4n. Data acquisition means 40E receives the reference time from control means 40B, the measured data from measuring means 40C, and the unit's time from unit's time output means 40D as inputs respectively and stores the results of processing based on these input reference time, measured data and unit's time to FIFO 40A.

Operations of the system shown in FIG. 2 to FIG. 4 will be described. Data processing unit 30 outputs to measuring part 40 signals composed of setup conditions for carrying out measurement (such as measuring period, measuring range, etc.) and commands such as measurement start or end. These signals are converted to a communication signal (a packet which is a block of data) together with the reference time from reference time output means 31 by general communication circuit 10A in data processing unit 30, and this signal is output to general communication line 100.

Further, data processing unit 30 operates so that each of all the packets to be output to measuring part 40 contains the reference time from reference time output means 31 and outputs a packet at a desired interval.

A packet from data processing unit 30 is input to each of units 41 to 4n in measuring part 40 via general communication line 100. Each general communication circuit 10A in each of units 41 to 4n extracts desired signals (setup conditions, commands, and reference time) from the input packet.

Control means 40B receives a signal output from general communication circuit 10A as an input and outputs the reference time to data acquisition means 40E and outputs control signals such as setup conditions and commands to measuring means 40C from this signal respectively.

Measuring means 40C carries out measurement according to the control signal from control means 40B. For example, as setup conditions, measuring period Δt for carrying out measurement and measuring ranges are included. Measuring means 40C also starts measurement according to the measurement start command and outputs measured data obtained to data acquisition means 40E.

Data acquisition means 40E receives the measured data from measuring means 40C, the unit's time from unit's time output means 40D, and the reference time from control means 40B as inputs. Data acquisition means 40E adds statuses (whether measured data are accurately acquired or not, or measured data are desired values or not, etc.) to each plurality of input data (measured data, unit's time, the latest input reference time), and stores these as tuple-data for which these data are used as tuples to FIFO 40A.

Figure 5:
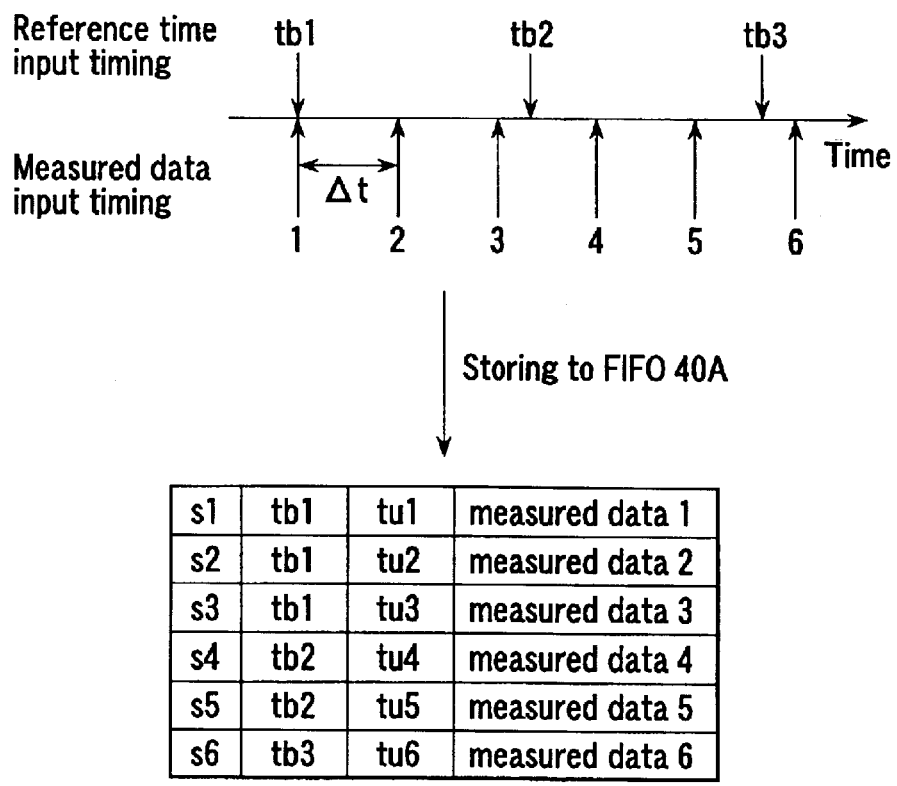
FIG. 5 is a drawing showing an example of operation in which data acquisition means 40E stores tuple-data in FIFO 40A.

FIG. 5 is a drawing showing a practical example of actions by which data acquisition means 40E stores the data to FIFO 40A based on the input reference times and measured data. In FIG. 5, data acquisition means 40E receives measured data 1 to 6 from measuring means 40C at every measuring period Δt as inputs. Of course, although measured data are subsequently input continually after measured data 6, those are herein omitted. In addition, reference times tb1 to tb3 are input from control means 40B, and unit's times tu1 to tu6 are input from unit's time output means 40D at a period sufficiently shorter than measuring period Δt or at the same step as that of the output of measuring means 40C.

Now, it is assumed that reference time tb1 is input at the same instant as measured data 1, reference time tb2 is input between measured data 3 and 4, and reference time tb3 is input between measured data 5 and 6.

Data acquisition means 40E stores measured data 1 to 6 in turn every time the measured data are input. For example, for measured data 1, the latest input reference time tb1, unit's time tu1 and status s1 for measured data 1 are stored to FIFO 40A from data acquisition means 40E as a tuple. For measured data 2, reference time tb1, unit's time tu2 and status s2 for measured data 2 are stored to FIFO 40A from data acquisition means 40E as another tuple. For measured data 3, similar to the above, reference time tb1, unit's time tu3 and status s3 are stored to FIFO 40A from data acquisition means 40E as the third tuple.

For measured data 4, newly input reference time tb2, unit's time tu4 and status s4 are stored to FIFO 40A from data acquisition means 40E as the next tuple. Subsequently, similar to the above, data acquisition means 40E stores reference time tb2, unit's time tu5 and status s5 to FIFO 40A as one tuple for measured data 5, and stores newly input reference time tb3, unit's time tu6 and status s6 to FIFO 40A as another tuple for measured data 6.

As described above, data acquisition means 40E repeatedly arranges a plurality of parameters as a tuple and stores them to FIFO 40A.

Figure 7A:
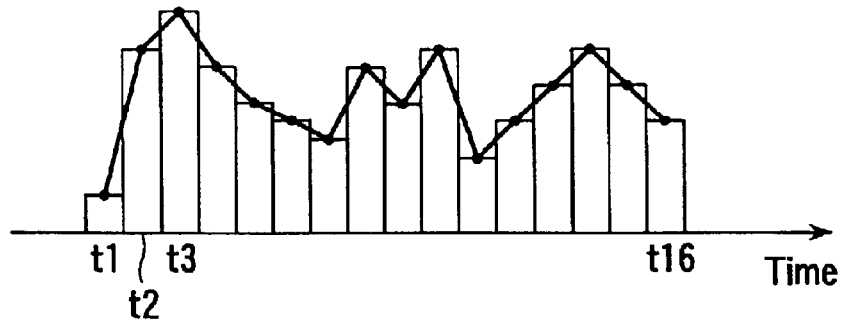
FIG. 7 is a drawing showing examples of operations of interpolating means 34, filtering means 35, and resampling means 36 in the system shown in FIG. 2.

Subsequently, operations, in which data processing unit 30 and measuring part 40 determine the measured data whose synchronization is secured from the tuple-data arranged as a tuple, are described using the flowchart in FIG. 6 and the drawing in FIG. 7. FIG. 7 is a drawing showing practical examples in which data processing unit 30 processes tuple-data. In FIG. 7, drawing (a) shows an example of interpolating measured data by interpolating means 34, drawing (b) shows an example of filtering by filtering means 35, and drawing (c) shows an example of resampling by resampling means 36, respectively.

Number-of-data calculating means 32 calculates the number of tuple-data to be read from FIFO 40A in each of units 41 to 4n. If measured data for a desired time interval are read assuming the measuring period of measuring means 40C as Δt, the number of tuple-data can be expressed as equation (1).

$$\text{(The number of tuple-data to be read)} = \text{(desired time interval)} / \text{(measuring period } \Delta t) \quad (1)$$

However, measuring periods of measuring means 40C for each of units 41 to 4n are, in general, slightly different from each other. For example, if it is assumed that the measuring period of measuring means 40C in unit 41 is $\Delta t1 = \Delta t$, and that the measuring period of measuring means 40C in unit 42 is $\Delta t2 = \Delta t + \alpha$ (where $0 < |\alpha| < \Delta t$) for the setup period Δt, the number of tuple-data to be read in unit 41 and unit 42 is different. Number-of-data calculating means 32 calculates the number of tuple-data to be read considering such error and outputs the calculated result to general communication circuit 10A (S10). Errors of Δt1, Δt2, etc. for measuring periods in each of units 41 to 4n are herein determined offline or in designing.

General communication circuit 10A in data processing unit 30 converts the calculated results output from number-of-data calculating means 32 and the reference time from reference time output means 31 into a packet and distributes this packet to each general communication circuit 10A in each of units 41 to 4n (S11) via general communication line 100.

Control means 40B in each of units 41 to 4n outputs a reference time from a signal extracted in general communication circuit 10A in each of units 41 to 4n to data acquisition means 40E as well as reads tuple-data in FIFO 40A based on the calculated results in number-of-data calculating means 32 and outputs those data to general communication line 100 via general communication circuit 10A (S12).

General communication circuit 10A in data processing unit 30 extracts tuple-data in FIFO 40A from packets output from each of units 41 to 4n and stores them to memorizing means 33 (S13).

Interpolating means 34 reads tuple-data of each of units 41 to 4n stored in memorizing means 33 and calculates measuring times for each of measured data using measured data in each of units 41 to 4n and reference times and measuring period Δt. For example, in FIG. 5, the measuring time of measured data 1 is reference time tb1; the measuring time of measured data 2 is reference time tb1+measuring period Δt; the measuring time of measured data 3 is reference time tb1+(2×measuring period Δt); and the measuring time of measured data 4 is reference time tb2; and subsequent data measuring times are determined similar to the above. Interpolation (of the first degree or second degree and others) is carried out for measured data at measuring times t1 to t16. In FIG. 7, although data for only 16 points are shown, of course data for any number of points can be handled (S14).

Figure 7B:
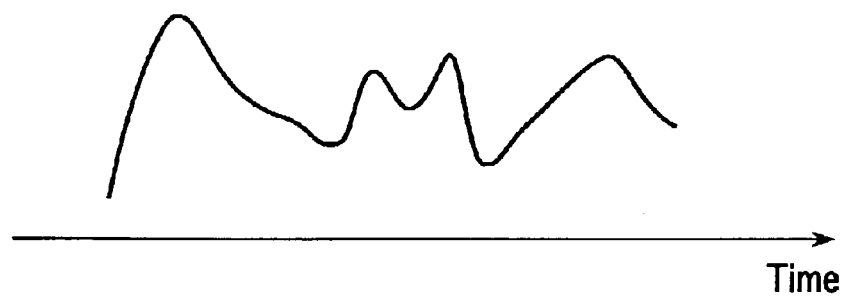

Filtering means 35 applies desired filtering processing, such as low-pass filtering processing, to the data subjected to interpolation by interpolating means 34, as shown in the drawing of FIG. 7(b) (S15).

Figure 7C:
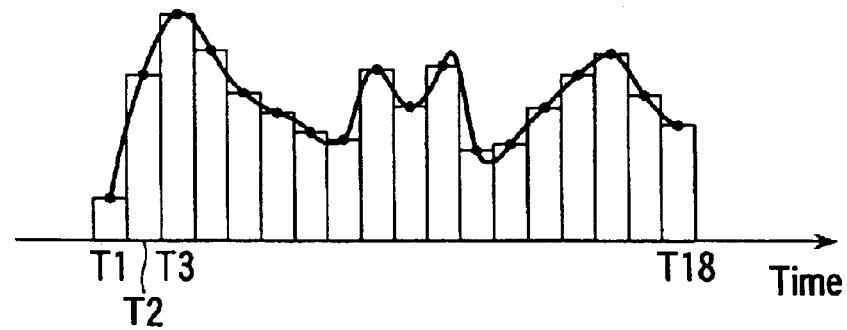

Resampling means 36 resamples the data subjected to filtering processing by filtering means 35 at the instants T1 to T18 for securing synchronization with other units 41 to 4n, as shown in the drawing shown in FIG. 7(c) (S16).

For all the tuple-data sent from each of units 41 to 4n, if measured data synchronization is not secured, interpolation, filtering and resampling are carried out for the data of units 41 to 4n whose synchronization is not secured (S17, S14 to S16).

If synchronization of measured data is secured for all the tuple-data sent from each of units 41 to 4n, data processing unit 30 applies desired processing and analysis to the resampled measured data and stores resampled measured data and the results of processing and analysis to a memorizing part not shown in the drawing, such as hard disk and memory, or displays the resampled measured data and the results of processing and analysis in a display not shown in the drawing (S17, S18).

As described above, data acquisition means 40E in each of units 41 to 4n arranges a reference time and measured data at that measuring time as a tuple and stores the tuple-data arranged as a tuple to FIFO 40A. Data processing unit 30 receives tuple-data stored in FIFO 40A as inputs. Since measured data are resampled at desired time T1 to T18 using reference times and measured data of the input tuple-data, measured data whose synchronization is secured among each of units 41 to 4n can be determined. This avoids degrading synchronizing waveforms and being affected by the transfer delay due to the increase of units 11 to 1N as in measuring part 10. Accordingly, the number of units 41 to 4n can be easily increased and measured data whose synchronization among units 41 to 4n is secured can be determined, without being restricted by the number of units 41 to 4n in measuring part 40.

Further, data acquisition means 40E in each of units 41 to 4n arranges measured data using a reference time and measuring period Δt as a tuple and stores the tuple-data arranged as a tuple to FIFO 40A. Number-of-data calculating means 32 calculates the number of tuple-data required for resampling. Based on the calculated results, tuple-data stored in FIFO 40A are input to data processing unit 30. Data processing unit 30 resamples the measured data at desired times T1 to T18 using the reference times of input tuple-data and the measured data. This enables the measured data whose synchronization is secured among units 41 to 4n to be determined even if measured period Δt is shifted in each of units 41 to 4n. Accordingly, the number of units 41 to 4n can be easily increased and measured data whose synchronization among units 41 to 4n is secured can be determined, without being restricted by the number of units 41 to 4n in measuring part 40.

In addition, since communications between data processing unit 30 and each of units 41 to 4n are implemented in the same communication system, these units are connected only with general communication line 100 to exchange signals. This does not require the use of dedicated communication line 200. Therefore, the cost is reduced and the system configuration is simplified.

Furthermore, since each of units 41 to 4n communicates with data processing unit 30 directly, signal input/output is conducted only with general communication circuit 10A. This makes the use of dedicated communication circuit 10B unnecessary for synchronizing signals and it is not necessary to prepare different types of units, such as main unit 11 and subunits 12 to 1N. Therefore, the cost is reduced and the system configuration is simplified.

Further, the present invention is not restricted to the embodiment described above but may be embodied in such manners as described below.

Although FIG. 4 and FIG. 5 show the configuration in which data acquisition means 40E stores each one of measured data 1 to 6, reference times tb1 to tb3, unit's times tu1 to tu6, and statuses s1 to s6 as a tuple to FIFO 40A for each of measured data 1 to 6, another configuration in which both or either one of unit's times tu1 to tu6 and statuses s1 to s6 are not stored to FIFO 40A may also be used. If unit's times tu1 to tu6 are not stored to FIFO 40A, it may not be necessary to prepare unit's time output means 40D.

Although FIG. 4 and FIG. 5 also show the configuration in which measuring means 40C carries out measurement according to the period interval Δt, which is one of the setup conditions from data processing unit 30, independent of the timing when packets are sent out, measurement may be carried out matching with the timing when a packet is sent out from data processing unit 30.

Further, if interpolating means 34 checks the statuses of tuple-data arranged as tuples in memorizing means 33 and the condition of any status is abnormal, the measured data corresponding to this status may be canceled or an alarm signal may be output or other actions may be taken. This enables data processing unit 30 to easily discriminate the condition of measured data.

Furthermore, although the configuration in which data processing unit 30 makes all the packets to be output to general communication line 100 contain the reference time from reference time output means 31 is shown, the reference time may be contained only in arbitrary packets.

In addition, although the configuration in which the data whose synchronization is secured using the reference time and measured data is shown, if information on reference time is missing, the unit's time may be used for backing up the reference time. For example, in FIG. 5, if the reference times of tb1 and tb2 corresponding to measured data 2 to 5 are missing, the unit's times of tu2 to tu5 may be used. In this case, it is better to correct the unit's times of tu2 to tu5 using reference time tb1 and unit's time tu1 arranged in the same tuple as measured data 1 and reference time tb3 and unit's time tu6 arranged in the same tuple as measured data 6. This enables measured data whose synchronization among units 41 to 4n is secured to be determined even if information on one or two reference times is missing.

Moreover, although the configuration in which reference time output means 31 is provided in data processing unit 30 is shown, reference time output means 31 may be provided separate from the data processing unit. In other words, the data processing means which processes various data and the reference time output means may be configured separately.

According to the present invention, the following effects are obtained:

First, each of a plurality of measuring units outputs tuple-data, which are obtained by arranging reference times from the data processing unit and measured data obtained by measuring the objects to be measured as tuples, to the data processing unit via a communication line. The data processing unit determines measured data in which synchronization among a plurality of measuring units is taken based on the reference times of tuple-data. This secures synchronization of the measured data, unaffected by degradation of waveforms and delay of transfer of synchronizing signals caused by an increase in the number of measuring units. Accordingly, measured data whose synchronization is secured without generating problems among a plurality of measuring units can be determined without being restricted by the number of measuring units.

Second, since communications between the data processing unit and each of a plurality of measuring units can be performed with the same communication system, the cost is reduced and the system configuration is simplified.

Third, the measured waveforms are restored using measured data and resampled at the desired instants. This enables the measured data securing synchronization to be determined even if the measuring times are different in each measuring unit.

Fourth, the data acquisition means adds the unit's time for backup to each of tuple-data and stores them to the data memorizing means. The interpolating means, if the reference time for the tuple-data arranged as a tuple in the data memorizing means is missing, interpolates the measured data using the unit's time. This enables the measured data whose synchronization is secured among a plurality of measuring units to be determined even if the reference time is missing.

Fifth, the data acquisition means adds a status corresponding to the condition of the measured data to the tuple-data arranged as a tuple and stores them to the data memorizing means. This enables the condition of measured data to be easily discriminated.

In addition, a plurality of measuring units receives the reference times from the reference time output means as inputs via the communication line and outputs the reference times together with the measured data as tuple-data to the data processing means via the communication line, and the data processing means takes synchronization of measured data among the measuring units based on the reference times within tuple-data. This enables measured data whose synchronization is secured without generating problems among a plurality of measuring units to be obtained without being restricted by the number of measuring units.

What is claimed is:

1. A measured data synchronizing system comprising:
   a communication line,
   a plurality of measuring units, each of which receives a reference time from the above communication line as an input and outputs tuple-data in which at least the above reference time and the measured data are contained and arranged as a tuple, and
   a data processing unit which outputs a reference time to said communication line, receives tuple-data from each of said plurality of measuring units as inputs and takes synchronization of the measured data among the measuring units based on the reference time of the tuple-data.

2. A measured data synchronizing system in accordance with claim 1, wherein said data processing unit restores measuring waveforms using the measured data and carries out resampling at desired times.

3. A measured data synchronizing system in accordance with claim 1 or claim 2, wherein said data processing unit comprises:
   a communication circuit which inputs/outputs signals from/to a plurality of measuring units via a communication line,
   a reference time output means which outputs reference times to this communication circuit,
   a memorizing means in which tuple-data for said plurality of measuring units output from said communication circuit are stored,
   an interpolating means which reads the tuple-data in said memorizing means, interpolates the data based on the read tuple-data, and outputs the interpolated data,
   a filtering means which carries out filtering of the interpolated data from said interpolating means and outputs the filtered data, and
   a resampling means which resamples the filtered data from said filtering means at desired times.

4. A measured data synchronizing system in accordance with any of claim 1 or 2, wherein said measuring unit comprises:
   a communication circuit which inputs/outputs signals from/to said data processing unit via a communication line,
   a data storing means which stores tuple-data,
   a control means which outputs a reference time and a control signal by a signal from said communication circuit, reads the tuple-data in said data storing means, and outputs the read tuple-data to said communication circuit,
   a measuring means which measures the object to be measured according to the control signal of said control means and outputs the measured data, and
   a data acquisition means which receives at least the measured data in said measuring means and the reference time from said control means as inputs and stores the tuple-data in which those inputs are arranged as a tuple to said data storing means.

5. A measured data synchronizing system in accordance with claim 4, wherein said data storing means is an FIFO.

6. A measured data synchronizing system in accordance with claim 4, wherein said measuring unit has a unit's time output means which outputs a unit's time, and said data acquisition means receives said unit's time from the unit's time output means, measured data, and a reference time as inputs and stores the tuple-data in which those inputs are arranged as a tuple to said data storing means.

7. A measured data synchronizing system in accordance with claim 6, wherein said interpolating means, if the reference time is missing, carries out interpolation using said unit's time.

8. A measured data synchronizing system in accordance with any of claim 4, wherein said measuring unit has a unit's time output means which outputs a unit's time, and said data acquisition means receives said unit's time from the units time output means, measured data, and a reference time as inputs and stores the tuple-data in which those inputs are arranged as a tuple to said data storing means.

9. A measured data synchronizing method in which,
   a reference time output means outputs reference times to a communication line,
   a plurality of measuring units outputs tuple-data in which at least said reference data and measured data obtained by measuring objects to be measured are arranged as tuples to said communication line, and
   a data processing means receives said tuple-data as inputs from said communication line and takes synchronization among measured data in each measuring unit based on the reference times within said tuple-data.

* * * * *